United States Patent [19]
Kurosawa

[11] Patent Number: 5,019,023
[45] Date of Patent: May 28, 1991

[54] SPEED CHANGER MECHANISM FOR ELECTRICALLY POWERED TOOL

[75] Inventor: Hideki Kurosawa, Katsuta, Japan

[73] Assignee: Hitachi Koki Company, Limited, Tokyo, Japan

[21] Appl. No.: 422,405

[22] Filed: Oct. 16, 1989

[30] Foreign Application Priority Data

Oct. 14, 1988 [JP] Japan ............................. 63-134674[U]
Oct. 14, 1988 [JP] Japan ............................. 63-134675[U]

[51] Int. Cl.⁵ .......................... F16H 3/08; F16H 3/083
[52] U.S. Cl. ................................... 475/269; 74/421 A; 192/114 T
[58] Field of Search ............... 475/207, 270, 343, 269; 74/421 A; 192/70.2, 114 T

[56] References Cited

U.S. PATENT DOCUMENTS

| | | | |
|---|---|---|---|
| 3,219,164 | 11/1965 | Henyon | 192/114 T |
| 3,430,521 | 3/1969 | Kulman | 475/270 X |
| 3,871,786 | 3/1975 | Rennerfelt | 192/114 T X |
| 3,918,560 | 11/1975 | Zach, Jr. | 192/114 T |
| 4,493,223 | 1/1985 | Kishi et al. | 74/421 A X |
| 4,619,162 | 10/1986 | Van Laere | 74/421 A X |

FOREIGN PATENT DOCUMENTS 0584136 12/1977 U.S.S.R. ...................... 192/114 T

*Primary Examiner*—Allan D. Herrmann
*Assistant Examiner*—Khoi Q. Ta
*Attorney, Agent, or Firm*—Cushman, Darby & Cushman

[57] ABSTRACT

An electrically powered tool such as a drill has a gear holder drivable by a motor shaft and having a larger-diameter gear and a smaller-diameter gear, a transmission shaft rotatable by the gear holder for rotating an output shaft, the transmission shaft having a splined disc having first splines, a high-speed gear rotatably mounted on the transmission shaft and held in mesh with the larger-diameter gear, the high-speed gear having second splines, a low-speed gear rotatably mounted on the transmission shaft and held in mesh with the smaller-diameter gear, the low-speed gear having third splines, a pair of springs for normally urging the high- and low-speed gears to be axially held against opposite surfaces of the splined disc, and a clutch plate having internal axial teeth and axially slidably mounted on the splined disc. The clutch plate is axially movable in a position in which the internal axial teeth mesh with the first and second splines and a position in which the internal axial teeth mesh with the first and third splines.

5 Claims, 1 Drawing Sheet

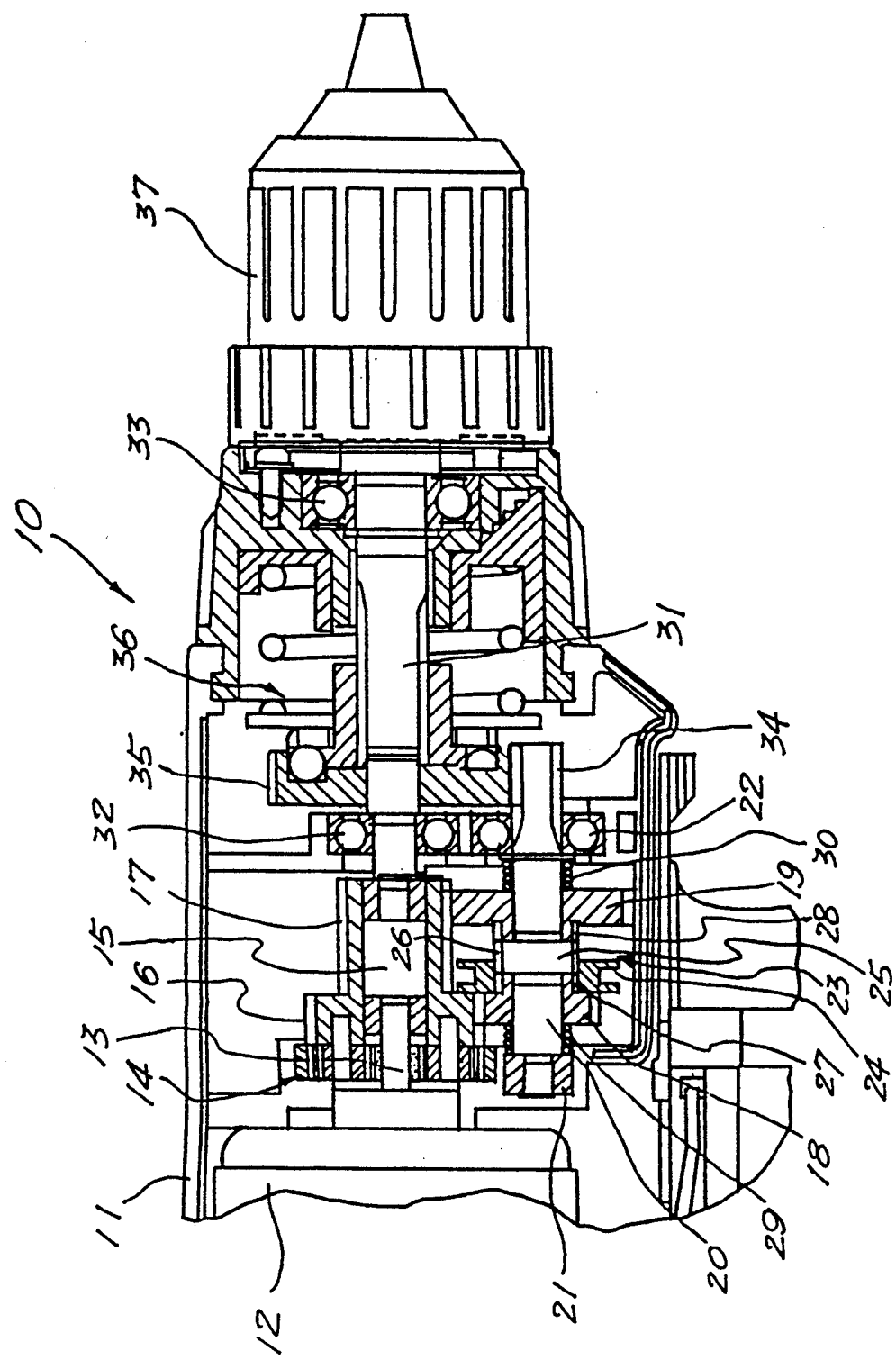

SPEED CHANGER MECHANISM FOR ELECTRICALLY POWERED TOOL

BACKGROUND OF THE INVENTION

1. Field of the Invention

The present invention relates to a speed changer mechanism for use in an electrically powered tool such as a drill.

2. Prior Art

Some electrically powered tools have a speed changer mechanism for rotating a tool such as a drill bit selectively at a high speed or a low speed. Typically, such a speed changer mechanism comprises a pair of high- and low-speed gears rotatably mounted on an output shaft and held in mesh with larger- and smaller-diameter gears, respectively, on a transmission shaft which is rotatable by a motor. Between the high- and low-speed gears that are axially spaced from each other, there is a dog clutch plate axially movably splined to the output shaft. The dog clutch plate can be axially moved by a shift knob which is manually rotated by the user of the tool. When a low-speed mode of operation is selected, the shift knob is rotated to axially move the dog clutch plate in one direction until teeth thereon fit into recesses defined in one side of the low-speed gear. Now, rotation of the transmission shaft is transmitted from the smaller-diameter gear thereon through the low-speed gear and the dog clutch plate to the output shaft which then rotates a tool coupled thereto. In a high-speed mode of operation, the dog clutch plate is axially moved in the opposite direction to fit its teeth into recesses defined in one side of the high-speed gear. The output shaft is then rotated by the transmission shaft through the larger-diameter gear, the high-speed gear, and the dog clutch plate.

The high- and low-speed gears are normally urged by respective springs so as to be pressed against a cylindrical member of the shift knob which engages a peripheral surface of the dog clutch plate. However, the high- and low-speed gears tend to undergo localized loads because their peripheral edge portions are pressed against the cylindrical member of the shift knob. Accordingly, the high- and low-speed gears are liable to generate noise during operation, and have a short service life due to localized wear thereof.

Another problem is that the high- and low-speed gears and the dog clutch plate are required to be large and heavy to transmit the torque from the transmission shaft to the output shaft.

SUMMARY OF THE INVENTION

It is an object of the present invention to provide a speed changer mechanism for an electrically powered tool, which includes high- and low-speed gears that are substantially free of localized loads and do not produce large noise.

Another object of the present invention is to provide a speed changer mechanism for an electrically powered tool, which is small in size and light in weight.

According to the present invention, there is provided a speed changer mechanism for a electrically powered tool having a motor shaft and an output shaft, comprising a gear holder drivable by the motor shaft and having a larger-diameter gear and a smaller-diameter gear, a transmission shaft rotatable by the gear holder for rotating the output shaft, the transmission shaft having a splined disc having first splines, a high-speed gear rotatably mounted on the transmission shaft and held in mesh with the larger-diameter gear, the high-speed gear having second splines, a low-speed gear rotatably mounted on the transmission shaft and held in mesh with the smaller-diameter gear, the low-speed gear having third splines, a pair of springs for normally urging the high- and low-speed gears to be axially held against opposite surfaces of the splined disc, and a clutch plate having internal axial teeth and axially slidably mounted on the splined disc, the clutch plate being axially movable in a position in which the internal axial teeth mesh with the first and second splines and a position in which the internal axial teeth mesh with the first an third splines.

The gear holder is axially coupled between and supported on the motor shaft and the output shaft.

The high- and low-speed gears have smaller-diameter portions, respectively, the second and third splines being disposed on the smaller-diameter portions, respectively The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWING

The sole FIGURE is a fragmentary cross-sectional view of an electrically powered tool which incorporates a speed changer mechanism in accordance with the present invention.

DETAILED DESCRIPTION

As shown in the sole FIGURE, an electrically powered tool 10, typically a drill, which incorporates a speed changer mechanism according to the present invention, has a casing 11 housing a motor 12 having a rotatable motor shaft 13 on which a planetary gear mechanism 14 is mounted. The motor shaft 13 also supports a gear holder 15 having a larger-diameter gear 16 and a smaller-diameter gear 17. The larger- and smaller-diameter gears 16, 17 are held in mesh with a smaller-diameter high-speed gear 18 and a larger-diameter low-speed gear 19, respectively. The high- and low-speed gears 18, 19 are axially spaced from each other and rotatably supported on an idler transmission shaft 20 which is rotatably supported in the casing 11 bearings 21, 22.

A clutch mechanism 23, which is disposed axially between the high- and low-speed gears 18, 19, includes an axially slidable clutch plate 24 having internal axial teeth. The transmission shaft 20 has a larger-diameter splined disc 25 positioned axially between the high- and low-speed gears 18, 19 and having splines 26 on its outer peripheral surface. The high- and low-speed gears 18, 19 have smaller-diameter portions projecting inwardly toward the splined disc 25 and having splines 27, 28 on their outer pheripheral surfaces. The splines 26, 27, 28 are axially adjoined and radially positioned on the same circular surface. The clutch plate 24 is disposed around the splined disc 25 and the smaller-diameter portions of the high- and low-speed gears 18, 19, with the internal axial teeth of the clutch plate 24 meshing with the splines 26, 27, 28. The axial dimension of the clutch plate 24 is such that the clutch plate 24 can mesh with the splines 26, 27 or the splines 27, 28, but not with all splines 26, 27, 28 simultaneously. The clutch plate 24 is axially movable by a shift knob (not shown) which can be operated by the user of the tool 10.

The high- and low-speed gears 18, 19 are normally urged so as to be held against the opposite sides of the splined disc 25 by respective helical compression springs 29 30 which are disposed under compression between the high-speed speed gear 18 and the bearing 21 and between the low-speed gear 19 and the bearing 22.

The tool 10 has an output shaft 31 rotatably supported in the causing 11 by bearings 32, 33. The output shaft 31 is operatively coupled to the transmission shaft 20 through a gear 34 on one end of the transmission shaft 20 and a gear 35 on one end of the output shaft, the gears 34, 35 meshing with each other. The rotation of the output shaft 31 can be controlled by a clutch mechanism 36 disposed between the output shaft 31 and the gear 35. A tool bit such as a drill bit (not shown) is axially connected to the output shaft 31 by a chuck 37.

The gear holder 15 is axially coupled between and supported by the motor shaft 13 and the output shaft 31.

The tool 10 thus constructed operates as follows:

When the tool 10 is to operate in a high speed mode, the clutch plate 24 is axially moved to the left as shown to connect the high-speed gear 18 to the transmission shaft 20 through the splines 26, 27. Then, the motor 12 is energized. The rotation of the motor 12 is transmitted from the motor shaft 13 through the planetary gear mechanism 14, the larger-diameter gear 16, the high-speed gear 18, and the clutch mechanism 23 to the transmission shaft 20. The transmission shaft 20 then rotates the output shaft 31 through the intermeshing gears 34, 35 at a high speed.

To operate the tool 10 in a low speed mode, the clutch plate 24 is axially moved to the right to connect the low-speed gear 19 to the transmission shaft 20 through the splines 26, 28. Then, the motor 12 is energized. The rotation of the motor 12 is transmitted from the motor shaft 13 through the planetary gear mechanism 14, the smaller-diameter gear 17, the low-speed gear 19, and the clutch mechanism 23 to the transmission shaft 18. The transmission shaft 18 then rotates the output shaft 31 through the intermeshing gears 34, 35 at a low speed.

Even if the clutch plate 24 does not immediately mesh the splines 27 or 28 when it is axially moved, the clutch plate 24 will be brought into mesh with the splines 27 or 28 under repulsive forces of the helical compression springs 29, 30 when the motor shaft 13 is rotated. Therefore, the clutch plate 24 can smoothly mesh with the splines 27 or 28 at all time irrespective of whether the high or low speed mode is selected. The speed changer mechanism of the present invention is thus smooth in operation.

Since the high- and low-speed gears 18, 19 are held at their surfaces around and near the axes thereof against the opposite sides of the splined disc 25, the high- and low-speed gears 18, 19 are free of localized loads and wear due to the compressive forces from the helical compression springs 29, 30. Accordingly, the high- and low-speed gears 18, 19 are held in smooth mesh with the larger- and smaller-diameter gears 16, 17, respectively, do not produce large noise, rotate smoothly, and have a long service life.

Inasmuch as the high- and low-speed gears 18, 19 and the clutch plate 25 are mounted on the transmission shaft 20, rather than the output shaft 31, they may be small in size and light in weight. The gear holder 15 which has the two gears 16, 17 is axially connected between and supported by the motor shaft 13 and the output shaft 31, so that the tool 10 is compact in size.

Although a certain preferred embodiment has been shown and described, it should be understood that many changes and modifications may be made therein without departing from the scope of the appended claims.

What is claimed is:

1. A speed changer mechanism for an electrically powered tool having a motor shaft and an output shaft, comprising:
   a gear holder drivable by the motor shaft and having a larger-diameter gear and a smaller-diameter gear;
   a transmission shaft rotatable by said gear holder for rotating the output shaft, said transmission shaft having a splined disc mounted thereon, said splined disc having first splines:
   a high-speed gear rotably mounted on said transmission shaft and held in mesh with said larger-diameter gear, at all times, said high-speed gear having second splines;
   a low-speed gear rotatably mounted on said transmission shaft and held in mesh with said smaller-diameter gear at all times, said low-speed gear having third splines;
   a pair of springs for normally urging said high- and low-speed gears to be axially held against opposite surfaces of said splined disc; and
   a clutch plate having internal axial teeth and axially slidably mounted on said splined disc, said clutch plate being axially movable in a position in which said internal axial teeth mesh with said first and second splines and a position in which said internal axial teeth mesh with said first and third splines.

2. A speed changer mechanism according to claim 1, including said motor shaft and said output shaft, wherein said gear holder is axially coupled between and supported on said motor shaft and said output shaft.

3. A speed changer mechanism according to claim 1, wherein said high- and low-speed gears have smaller-diameter portions, respectively, said second and third splines being disposed on said smaller-diameter portions, respectively.

4. A speed changer mechanism according to claim 1 wherein said gear holder and said larger-diameter and smaller-diameter gears are integral with each other.

5. A speed changer mechanism as in claim 1 wherein the motor shaft and the output shaft share further include a common axis of rotation and the transmission staff further includes an axis of rotation parallel to, but spaced apart from, said motor and output shaft axis of rotation.

* * * * *